United States Patent [19]

Heckmann et al.

[11] Patent Number: 4,758,342
[45] Date of Patent: Jul. 19, 1988

[54] HYPERFILTRATION MEMBRANES HAVING SEPARATION LAYERS OF MONOMOLECULAR FILMS OF SURFACTANTS

[75] Inventors: Klaus Heckmann, Zum Aichahof 20, D-8400 Regensburg; Georg Manecke, Berlin; Beate Pfannenmüller, Freiburg; Klaus Ring, Frankfurt; Helmut Ringsdorf, Mainz, all of Fed. Rep. of Germany

[73] Assignee: Klaus Heckmann, Regensburg, Fed. Rep. of Germany

[21] Appl. No.: 598,083

[22] Filed: Apr. 9, 1984

Related U.S. Application Data

[63] Continuation of Ser. No. 351,286, Feb. 22, 1982, abandoned.

[30] Foreign Application Priority Data

Feb. 27, 1981 [DE] Fed. Rep. of Germany ....... 3107527

[51] Int. Cl.[4] ............................................. B01D 13/00
[52] U.S. Cl. ................................... 210/490; 55/158; 210/500.21; 210/500.27; 210/500.28; 210/500.29; 210/500.36; 210/506
[58] Field of Search ........... 210/490, 500, 506, 500.21, 210/500.27, 500.28, 500.29, 500.36; 55/158; 204/296; 351/286

[56] References Cited

U.S. PATENT DOCUMENTS

| | | | |
|---|---|---|---|
| 3,129,146 | 4/1964 | Hassler | 202/51 |
| 3,593,855 | 7/1971 | Stana | 210/500.2 |
| 3,780,147 | 12/1973 | Stana | 210/500.2 |
| 3,892,665 | 7/1975 | Steigelmann et al. | 210/500.2 X |

FOREIGN PATENT DOCUMENTS

| | | | |
|---|---|---|---|
| 2420846 | 11/1974 | Fed. Rep. of Germany ... | 210/500.2 |
| 2557355 | 6/1977 | Fed. Rep. of Germany ... | 210/500.2 |

OTHER PUBLICATIONS

Akimoto, A. et al, "Polymer Model Membranes", Angew. Chem. Int., Ed. Engl. 20 (1981), No. 1, pp. 90 and 91.

Day, David et al, "Morphology of Cystalline Diacetylene Monolayers . . . " *Macromolecules*, 1980, 13, No. 6, Nov.-Dec. 1980, pp. 1478-1483.

*Primary Examiner*—Richard V. Fisher
*Assistant Examiner*—W. Gary Jones
*Attorney, Agent, or Firm*—Walter H. Schneider

[57] ABSTRACT

The invention relates to a hyperfiltration membrane containing a supporting layer and a separation layer. The membrane is characterized in that the separation layer consists of a crosslinked monomolecular film of molecules, the molecules of the separation layer in the uncrosslinked state being surfactants or surfactant-like lipids containing at least one hydrophobic chain and at least one hydrophilic group, the hydrophobic chains of these molecules being oriented mainly perpendicularly to the plan of the membrane and parallel to the diffusion direction after crosslinking and the molecules of the separation layer being crosslinked with one another through functional groups in at least one of their hydrophobic chains and/or through functional groups in at least one of their hydrophilic groups. The invention also relates to a process for the production of hyperfiltration membranes in which the surfactant molecules or the surfactant-like lipid molecules are spread out under a certain spreading pressure or occupying an average space over the surface of an aqueous solution or at the interface between an aqueous solution and a liquid immiscible therewith, the surfactant molecules or the surfactant-like lipid molecules are crosslinked with one another and the separation layer crosslinked in this way is applied to a supporting membrane.

9 Claims, 4 Drawing Sheets

HYPERFILTRATION MEMBRANES HAVING SEPARATION LAYERS OF MONOMOLECULAR FILMS OF SURFACTANTS

This is a continuation of application Ser. No. 351,286 filed Feb. 22, 1982, now abandoned.

BACKGROUND TO THE INVENTION

The invention relates to hyperfiltration membranes (HFM) and to processes for their production.

Membranes are thin flat foils and films which are distinguished by a certain strength and elasticity. They may consist of plastics or natural products and, by virtue of their filter effects, have considerable significance in separation technology. For example, membranes of high polymers are used for industrial separation processes, such as desalination by reverse osmosis, for dialysis, ultrafiltration, hyperfiltration, etc. Hyperfiltration is used in particular for the separation of high molecular weight substances from solutions. Particularly fine-pored membranes and high pressures are used for this purpose.

HFM's of cellulose acetate are most widely used. In addition, membranes of polyamides, fluorine-containing polymers and also polyureas and sulfonated polyarylethers are acquiring increasing interest. Membranes of these materials are anisotropic because they consist of several vertically adjacent layers having different physical-chemical properties. For example, they consist of a thick porous supporting layer and a comparatively thin and compact separation layer. In all these layers, the polymer molecules are arranged in the form of a felt. Chain intervals, chain interval distribution, fixed-charge concentration, polarity and the swelling capacity of the polymer chains in these felt structures determine the important properties of the membranes. Thus, in special reverse osmosis membranes for example, the polymer chains of the separation layer are on average so dense that, despite a good dissolving effect on individual water molecules, the formation of water clusters does not for the most part occur. It is presumably for the same reason that the separation layer is unable to take up any hydrated ions. This is the basis for its high retention power for dissolved salts.

Membrane separation processes have a high thermodynamic useful effect by comparison with separation processes which rely on phase transitions (for example evaporation, distillation). In addition, they do not cause any waste-heat problems. However, their use on a commercial scale is still hampered by a number of unsolved problems:

The throughput of most of the HFM's hitherto developed is too low. This is attributable inter alia to the excessive thickness of the separation layers. Constant separation layer thicknesses of less than 50 Å are desirable. This would mean a reduction in thickness by a factor of 5 to 10 in relation to the separation layer thicknesses commonly used today. Although there have been several reports of separation layer thicknesses of the order of 50 Å, the thickness values in question are generally the minimal thicknesses of separation layers whose thickness is in any case subject to considerable variation. These variations are attributable to the fact that the separation layers consist entirely of polymers having a predominantly amorphous felt structure which fill out the unevennesses in the underlying surface of the supporting layers. Another reason for the excessively low throughput of HFM's lies in the fact that their porous structures undergo increasing compaction with increasing pressure differences.

The permeability and hence the throughput of the amorphous separation layers is additionally impaired by the fact that all the diffusion coefficients are unnecessarily reduced by indirect factors.

Aside from special cases, the separation power of hitherto developed HFM's is inadequate. The felt structure of the separation layers is again responsible for this. The significant local variations in the intervals between the polymer chains of a predominantly amorphous layer do not provide for high specificity. Not one of the processes used for applying the separation layers enables average intervals to be adjusted exactly between the polymer chains. Separation layers having substantially constant and exactly adjustable intervals between their chains are desirable.

The useful lives of hitherto developed membranes are too short. This is due primarily to so-called "fouling". Fouling is understood to be the adsorption of—mostly negatively charged—colloidal impurities and microorganisms on the surfaces of the separation layers. This disadvantage is also due in part to the amorphous structure of the separation layers. Fouling is successfully prevented by the application of negative fixed charges to the outer surface of the separation layers. Under the effect of these fixed charges, the impurities referred to are electrostatically repelled. The repelling effect increases with increasing fixed charge density. However, the charge densities attainable with crosslinked or uncrosslinked amorphous linear polyelectrolytes are below the theoretically attainable maximum charge densities. Negative charge densities substantially corresponding to a very close packing of the fixed charges are desirable.

In a number of special cases, it has been possible to produce HFM's which show either a high throughput or a high power of separation or long useful lives. However, it has not been possible to combine all three required properties in one and the same membrane. The reason for this—as already explained—lies primarily in the amorphous structure of the separation layers.

STATE OF THE ART

Numerous HFM's and their separation layers are described in the literature and particularly in the following patent specifications of fairly recent date. However, all these hitherto produced separation layers have an amorphous felt structure.

The first reverse-osmosis HFM's were made of cellulose acetate and were developed by Loeb-Sourirajan. They are described in U.S. Pat. Nos. 3,133,132; 3,133,137 and 3,344,214. The membranes consist of two layers, namely an active layer (separation layer) and the substrate (supporting layer). Their disadvantages include the susceptibility to hydrolysis of the ester functions, the phenomenon of compaction at high pressures and the excessive separation layer thickness mentioned earlier on which is largely responsible for the poor throughput of the membrane.

Another type of reverse-osmosis two-layer membranes are the "dynamic" membranes in whose case the separation layers are only formed in situ in service by closure of the openings of ultrafiltration membranes (U.S. Pat. No. 3,462,362). Naturally, membranes of this type cannot be produced in a form in which they are ready for use. The properties of the separation layers vary with the nature of the closing material and the closing process has to be repeated relatively frequently. In this case, too, the separation layers are amorphous, giving rise to the well-known disadvantages.

It has also been proposed to increase the number of layers in reverse-osmosis membranes (U.S. Pat. No. 3,556,305). Interesting advances can be made in this way. Thus, the separation layers show considerably improved permeability levels for a fairly constant thickness. This result is achieved by applying an anisotropic separation layer, consisting of a microporous skin and a macroporous substrate, to a diffusion membrane (supporting layer) via an adhesive layer. Accordingly, the membrane consists in all of four layers. All four layers—regarded individually—have amorphous felt structures.

Another composite HFM is described in U.S. Pat. No. 3,648,845. In this case, a fine dense separation layer (predominantly of cellulose acetate) is applied via a surface layer to a porous support (supporting layer). The surface or cover layer largely prevents the polymer of which the separation layer consists from penetrating into the pores of the supporting layer. Although a penetration layer of relatively constant, minimal thickness can be produced in this way, the other disadvantages of the amorphous structure still exist.

Thereafter, an attempt was made to eliminate the surface layer and thus to simplify the structure of the membrane (U.S. Pat. No. 3,676,203). In very special cases, this attempt proved successful. It was possible to apply separation layers of polyacrylic acid to supporting layers of cellulose acetate/cellulose nitrate mixtures. However, this membrane not only had the disadvantages attributable to the susceptibility to hydrolysis of the ester bonds and to the solubility in water and swellability of the separation layer, it also had the known disadvantages attributable to the amorphous structures.

DE-OS No. 25 57 355 describes a two-layer HFM which, in addition to other favourable properties, has a minimal separation layer thickness and, because of this, is said to perform well in reverse osmosis, even at moderate pressures. However, it must be concluded from the chemical composition of the membrane and from the process by which the separation layer is applied that both layers of the membrane are amorphous. In addition, the performance levels of the membrane are not optimal, as can be seen from the figures disclosed.

A process for the production of thin polymer films of reproducible thickness is described in DE-OS No. 2,420,846. The film-forming material is a linear polymer (for example a silicone/polycarbonate copolymer). It is dissolved in a readily volatile solvent (for example in chloroform) and cast onto the surface of a liquid in which neither the solvent nor the polymer is soluble. Water is preferably used for this purpose. The solution spreads out over the surface, the solvent evaporates and the film remains behind in the form of a layer from 250 Å to 500 Å thick. To eliminate holes in the film thus formed, it is recommended to cast several layers one over the other. The film ultimately obtained may be applied to a porous support (for example an ultrafiltration membrane) and, together with that support, forms the actual membrane which may be used for separation purposes. In this case, too, the actual separation layer is amorphous and has the corresponding disadvantages.

Accordingly, no attempt has been made in the past to turn away from the concept of the amorphous separation layer with its felt structure for hyperfiltration purposes. Hitherto, no separation layers combining high permeability with high power of separation and a long useful life have been available for this purpose.

OBJECT OF THE INVENTION

Accordingly, the object of the present invention is to provide membranes which combine high permeability with a long useful life, are easy to produce and do not have any of the disadvantages of known membranes.

EXPLANATION OF THE INVENTION

The object as stated above may be achieved by producing the separation layers on the same physicochemical principle which is materialised in the lipoid film of biological membranes. This lipoid film has a well-ordered velvet structure in contrast to the amorphous felt structure of the separation layers of technical membranes. It shows high permeability to water and a high retention capacity for most salts, it has well-defined permeability for low molecular weight substances and, in particular, it is very thin. Its thickness is between 20 and 40 Å which is less than one tenth of the thickness of separation layers of known technical membranes and thus corresponds to the separation layer thickness desirable for high throughput technical membranes.

By virtue of the orientation of the lipoid molecules, the lipoid film has a palisade or velvet structure in which the long axes of the alkyl chains are perpendicular to the plane of the membranes and hence parallel to the diffusion direction. Indirect factors are substantially negligible. The high permeability to water and the high retention capacity of the film, for example for salts, are attributable to the fact that the alkyl chains of the lipoids contain groups having plasticiser functions (double bonds, lateral methyl groups, cyclopropyl groups). These groups prevent the lipoid molecules from crystallizing and keep the film in a two-dimensional liquid state. The packing density of the lipoid molecules in these liquid films is on the one hand so loose that it enables individual water molecules for example to pass through and, on the other hand, so tight that water clusters are unable to form, as in the case of amorphous separation layers having a felt-like structure. In contrast to the felt structure, however, the intervals between the individual lipoid molecules are defined very precisely and the interval distribution is narrow. The incorporation of suitable side chains or functional groups into the main chains enables the intervals between the lipoid molecules to be exactly maintained. As a result, the power of separation of the lipoid films is very pronounced. In addition, lipoid films of the type in question are "self-healing" from minor injuries as it were by virtue of the almost exclusively hydrophobic bond between the aliphatic chains of the molecules. It is also pointed out that the lipoid layers of biological membranes are optically active.

However, the permeability of biological membranes is not determined solely by the permeability of their bimolecular lipoid regions, but also by the fact that these lipoid regions are capable of solubilising or otherwise taking up hydrophobic carrier or pore molecules. In many cases, these carriers or pores are capable of promoting a high selective and rapid diffusion of small molecules from one membrane surface to the other.

It is known from fairly recent studies that even artificial monomolecular and bimolecular films are suitable for use as a matrix for the incorporation of carriers or of molecules which have selectively permeable passages in their interior. These pore molecules thus determine the permeability behaviour of the entire film to a very considerable extent.

From studies into lipid monolayers on water surfaces, it is also known that, under relatively high pressures per unit area, the lateral intervals between terminal fixed charges substantially correspond to the theoreticl minimum intervals in the case of very close two-dimensional packing. They may be continuously adjusted within certain limits by varying the pressure per unit area.

However, the physico-chemical building principle embodied in biological lipid films cannot be applied without restrictions and modifications to separation layers of technical membranes for a number of reasons. This is because the lipid films of most biological membranes are so-called "bimolecular" structures. The structures in question are reversible aggregates of lipoid molecules, each of which has one water-soluble head group and one water-insoluble hydrocarbon radical. In principle, the aggregates have exactly the same structure as the platelet-like micelles present in fairly high concentrated aqueous solutions of surfactants. In general, too, biological lipid films are accommodated in a medium having an average pH-value and a moderate temperature. Because of this, the chemical stability of the lipoids does not have to meet particularly stringent requirements. Specifically, the following disadvantages of lipoid films have to be taken into consideration in applying the physico-chemical building principle of the lipoid films of biological membranes to separation layers of technical membranes:

(1) In essence, bimolecular lipid films are held together and structured solely by hydrophobic and electrostatic bonds. Because of this, they are basically soluble in water and their useful life is inadequate for technical purposes. In addition, lipid molecules are solubilised by surfactant micelles so that lipid films are particularly unstable in surfactant-containing aqueous solutions. In technical operation, however, the presence of surfactants frequently cannot be avoided.

(2) The fixing of the biological bimolecular lipid films to the other components of the biological membrane is also largely electrostatic or hydrophobic in character. Main valency bonds are relatively rare. The similar anchoring of a lipid film as a separation layer to a technical gel or supporting layer would also not lead to a product having adequate useful lives for technical purposes.

(3) The charged head groups of biological lipids are generally sensitive to hydrolysis (choline phosphoric acid esters, ethanolamine phosphoric acid esters, etc.) whilst the surface charge densities of biological lipid films are pH-related. Both properties make it difficult to use biological lipid films as separation layers of technical membranes. The sensitivity to hydrolysis would shorten useful life and electrostatic protection against fouling would only be afforded in limited pH-ranges.

This lability of biological lipid films which prevents them from being directly used as separation layers of technical membranes may surprisingly be eliminated as follows with the main physico-chemical properties of the films remaining unaffected:

ad (1) Instead of bimolecular films being produced from monofunctional lipoid molecules, monomolecular films are produced from bifunctional or polyfunctional lipoids or surfactants. Recently, this somewhat modified building principle has also been observed in the membranes of highly specialised microorganisms. (*Thermoplasma acidophilum, Sulfolobus acidocaldarius*) which have adapted themselves to a very low pH-value and to high temperatures and of which the membranes are thus particularly resistant to hydrolysis.

ad (2) of the various possible methods available for applying a monomolecular separation layer in stable form to a porous supporting layer, two are mentioned as examples:

Firstly, mono- or bi-functional lipoids or surfactants may be polymerised with one another in the separation layer by utilising reactive groups (for example double bonds) and fixed to the supporting layer through further functional groups and possibly with a gel layer in between. In this case, a loss of self-healing power would basically have to be accepted because this method of crosslinking restricts the free lability of the hydrophobic lipoid chains. However, this disadvantage may be partly obviated by using lipoids or surfactants having two hydrophobic chains of which only one contains polymerisable groups whilst the other acts as an intramolecular plasticiser.

Another possibility is to use lipoid or surfactant molecules of which the hydrophilic terminal group consists of a relatively long and reactive chain which penetrates relatively deeply into the gel layer or the supporting layer. These chains also perform the functions of crosslinking the separation layer molecules and fixing the separation layer to the gel layer or the supporting layer. In this process, therefore, crosslinking does not take place in the hydrophobic part of the separation layer so that the separation layer retains its self-healing powers.

ad (3) To avoid the sensitivity to hydrolysis of the head groups and to obtain a surface charge density unaffected by pH, the lipoid or surfactant molecules of the separation layer as charged head groups should if possible contain either sulfonic acid or phosphonic acid groups. These groups are only slightly sensitive to hydrolysis and are still dissociated even in acid solutions.

However, the need to provide the separation layer surface (or rather those ends of the lipoid or surfactant molecules which are remote from the supporting layer) with fixed charges only arises when the membrane is to be used in aqueous medium, for example for desalination. In other cases, i.e. in particular when the membrane is used in an organic medium, for example in the pervaporation of hydrocarbon mixtures, the presence of fixed surface charges is not necessary. Even the sensitivity to hydrolysis of the biological lipids cannot have unfavourable effects in circumstances such as these. If, therefore, the membrane is to be used for separation purposes in an organic medium, its separation layer may have the structure of half a bimolecular lipid membrane and may even be directly produced from suitable biological lipids or similarly constructed surfactants. In that case, therefore, the separation layer consists of a monomolecular film of lipoids or surfactants of which the hydrophobic end faces the organic phase to be separated.

It is obvious that even optically active surfactants or surfactant-like lipoids may be used for the production of monomolecular separation layers. A chiral surface of monomolecular separation layers may also be produced by terminally modifying the surfactant molecules—after production of the actual separation layer—for example by reaction with optically active sultones or aminoacid derivatives.

Finally, the monomolecular separation layers may also be used for solubilising or incorporating hydrophobic carrier or pore molecules if it is intended technically to utilise the high transport selectivity of these molecules. A well-known example of a hydrophobic $K^+$-selective carrier is valinomycin whilst an example of a hydrophobic protein molecule with a $K^+$-selective passage is gramicidin.

DETAILED DESCRIPTION OF THE INVENTION

The invention relates to a hyperfiltration membrane containing a supporting layer and a separation layer which is characterised in that the separation layer consists of a crosslinked monomolecular film of molecules (a) the molecules of the separation layer in the uncrosslinked state being surfactants or surfactant-like lipoids having at least one hydrophobic chain and at least one hydrophilic group, (b) the hydrophobic chains of these molecules after crosslinking being oriented mainly perpendicularly of the plane of the membrane and parallel to the diffusion direction and (c) the molecules of the separation layer being crosslinked with one another through functional groups in at least one of their hydrophobic chains and/or through functional groups in at least one of their hydrophilic groups.

In the most simple case, surfactants or surfactant-like lipoids having a strongly hydrophilic head and a hydrophobic tail are used in the process according to the invention. However, it is also possible to use surfactants or surfactant-like lipoids which are characterised in that they contain a long hydrophobic central portion which at one end has a strongly hydrophilic group and at its opposite end a weakly hydrophilic group, (1) the hydrophilic character of the strongly hydrophilic group on the one hand and the hydrophobic character of the hydrophobic tail or the hydrophobic central portion on the other hand being co-ordinated with one another in such a way that, although the surfactant molecule as a whole does not have any appreciable solubility in water, it spreads effectively on the surface of aqueous solutions or at the interface between an aqueous solution and an organic liquid immiscible therewith (with the weakly hydrophilic group facing the gas zone or the organic liquid), (2) the hydrophobic tail or the hydrophobic central portion containing polymerisable groups and hence having the opportunity to crosslink with hydrophobic central portions of at least two adjacent molecules and/or the highly hydrophilic group containing reactive polymerisable and/or addable and/or condensible groups and hence affording the possibility to crosslink with highly hydrophilic groups of at least two adjacent surfactant molecules and with other molecules which are dissolved in the aqueous phase and of which the gel layer or the supporting layer of the membrane consists after crosslinking with the surfactant molecules and with one another, and (3) the weakly hydrophilic group affording the possibility of coupling on a more strongly hydrophilic group or of being itself converted into a more strongly hydrophilic group, i.e. the weakly hydrophilic group affords the possibility of coupling on a sulfonic acid, phosphonic acid, sulfuric acid, phosphoric acid, amino acid, carboxylic acid group, a primary, secondary or tertiary amine group or a quaternary ammonium group or another positively charged group or another strongly hydrophilic group or may itself be converted into a sulfonic acid, phosphonic acid, sulfuric acid, phosphoric acid, amino acid or carboxylic acid group or into a primary, secondary or tertiary amino group or into a quaternary ammonium group, another positively charged group or into another strongly hydrophilic group.

It is preferred to use surfactants or surfactant-like lipoids of the type described above which are distinguished by the fact that their hydrophobic tail or their hydrophobic central portion consists of linear or branched hydrocarbon chains and/or of partly or completely halogenated linear or branched carbon chains or of linear or branched silicone chains.

Other preferred surfactants or surfactant-like lipoids are distinguished by the fact that, at their end facing the gel layer or the supporting layer, on at least one of their hydrophobic chains or in the vicinity of their strongly hydrophilic group, they contain at least one sulfonic acid, phosphonic acid, sulfuric acid, phosphoric acid or carboxylic acid group or another group negatively charged in its dissociated state or a primary, secondary or tertiary amino group or a quaternary ammonium group or another positively charged group.

Other preferred surfactants or surfactant-like lipoids are those in which the parent substance of their hydrocarbon radicals consists of tri-, tetra- and higher terpenes, especially carotinoids.

Other preferred surfactants or surfactant-like lipoids are those which contain diene groups or diacetylene groups as polymerisable functions in their hydrophobic tail or in their hydrophobic central portion.

Other suitable surfactants or surfactant-like lipoids are distinguished by the fact that the strongly hydrophilic groups suitable for crosslinking are residues of mono-, di-, tri- or higher saccharides or residues of onic acids, saccharic acids or aminosugars or residues of aminoacids or oligopeptides or residues of polyhydric alcohols, aldehydes, carboxylic acids or amines or groups containing several carboxylic acid ester, epoxy, episulfide and sulfhydryl functions or groups containing activated double bonds, such as vinyl sulfones, or groups containing masked isocyanates, such as carboxylic acid azides. In addition, the chains of the hydrophobic central portion of the surfactants may be interrupted by oxygen groups.

The invention also relates to a process for the production of hyperfiltration membranes which is characterised in that, successively, but optionally with steps (b) and (c) changing places, (a) the surfactant molecules or the surfactant-like lipoid molecules are spread out under a certain spreading pressure or occupying an average space over the surface of an aqueous solution or at the interface between an aqueous solution and a liquid immiscible therewith, (b) the surfactant molecules or the surfactant-like lipoid molecules are crosslinked with one another and (c) the separation layer crosslinked in this way is applied to a supporting membrane or to a gel layer.

According to the invention and successively (1) the surfactant molecules or the surfactant-like lipoid molecules are spread out at certain average intervals apart over the surface or at the interface of an aqueous solution, (2) the spread surfactant molecules or surfactant-like lipoid molecules are crosslinked with one another either in the hydrophobic part or in the hydrophilic part of the monomolecular film, (3) optionally, the only weakly hydrophilic end of the surfactant molecules or of the surfactant-like lipoid molecules is converted into a sulfonic acid, phosphonic acid, sulfuric acid, phosphoric acid, amino acid or carboxylic acid group or into a primary, secondary or tertiary amino group or a quaternary ammonium group, another positively charged group or into another strongly hydrophilic group or is extended by one group which in turn contains a sulfonic acid, phosphonic acid, sulfuric acid, phosphoric acid, amino acid or carboxylic acid group or a primary, secondary or tertiary amino group or a quaternary ammonium group, another positively charged group or another hydrophilic group either in open form or in masked form, in which case the masked hydrophilic group is opened and (4) the crosslinked separation layer is applied to a porous and mechanically stable supporting layer.

The sequence of steps as listed above is not absolutely essential. For example, the surfactant molecules may be applied to the supporting layer before crosslinking. The particular sequence selected in each individual case will depend inter alia upon the stability of the spread monomolecular films. Thus, in the case of unstable monomolecular films, the subsequent hydrophilisation of the weakly hydrophilic ends of the surfactant molecules should only be carried out after application of the separation layer to the supporting layer.

In addition, the separation layer need not be directly applied to the supporting layer. Instead, a porous gel layer may even be arranged in between, for example if the surface of the supporting layer is too rough. The porous gel may be introduced into the pores of the supporting layer providing they are of such a size that the monomolecular separation layer would be unable to span them in the absence of further mechanical support. This is advisable for example when the HFM's are intended to function at very high pressures.

In favourable cases, it is sufficient simply to lay the separation layer on the supporting layer. This is the case when the HFM is used in a hydrophobic medium. In other cases, crosslinking of the separation and supporting (or gel) layer is necessary to ensure that the separation layer cannot become detached again. This is advisable for example when the HFM is intended to be used for separation processes in aqueous surfactant-containing solutions.

The separation layer may be applied to the supporting layer in different ways. The choice of the particular method used will depend primarily on whether small or large membrane surfaces are to be produced:

For small membrane surfaces, the best methods are those which follow the Langmuir or the Blodgett process. In these processes, the monomolecular film is compressed to a predetermined spreading pressure by a barrier on the surface of the subphase. Only then at the earliest can the film be crosslinked. The simplest method of application to the porous supporting layer is to lower the liquid level after a porous supporting membrane has been arranged at a slight angle or flat immediately beneath the surface of the water. The crosslinked monomolecular film applies itself to the supporting layer, water present in between drains off either between the film and the supporting layer or evaporates or is drawn under suction through the supporting layer, and the film ultimately covers the entire surface of the supporting layer. Both layers now adhere relatively firmly to one another. At this point, the two layers may now be crosslinked with one another. This could be followed as the final step by the subsequent hydrophilisation of the surface of the separation layer.

The sequence in which the individual steps are carried out may also be changed around. The monomolecular film is initially applied to the supporting membrane, lowered and then crosslinked either on its own or together with the supporting layer.

A not quite so precise but more simple process for applying the separation layer to the supporting layer, which may also be used for the production of membranes of large surface area, dispenses with the barrier for adjusting a certain spreading pressure. Instead, a well-defined quantity of surfactant is spread out over the surface of a solution accommodated in a trough having a funnel-like upper part and hydrophobic walls (PTFE). In this case, lowering of the liquid level results in compression of the monomolecular film to a predetermined area. Measurement of the quantity of surfactant applied must be so accurate that the predetermined area is reached on lowering exactly where the upper funnel-shaped part of the trough ends and the lower cylindrical or prismatic part begins. Thus, any further lowering does not result in any further compression of the film. The actual application of the separation layer to the supporting layer and the crosslinking reactions are carried out in the same way as described above.

In a third process, the supporting layer is drawn out from the aqueous subphase from below and through the monomolecular film under a constant spreading pressure. In this case, too, the water drains off between the film and the supporting layer.

In a fourth possible process, the supporting layer is introduced into the monomolecular (crosslinked or uncrosslinked, surfactant layer from above at a slight angle and pressed with that layer beneath the surface of the water. It is of course best to use hydrophobic supporting layers for this purpose.

There is a fifth process which may be adopted when the surfactant is still distinctly soluble in apolar organic media. In this case, the surfactant and/or the protective layer should contain reactive groups and should be able to react with one another without the addition of additional crosslinking reagents. The surfactant is dissolved in the organic phase and the hydrophilic—optionally moist—supporting membrane is simply immersed in the resulting solution or drawn therethrough. The surfactant and the surface of the supporting layer then react with one another to form a monomolecular surface film. The surfactant may be selected in such a way that, in the presence of water, it even crosslinks on its own. In this case, a crosslinked separation layer is obtained. The remaining operations are carried out as required, as already explained. This process may be used when the pores of the supporting layer are not too large or have been closed with a porous gel or when the entire supporting layer is coated with a gel layer.

It is obvious that one of these five processes may also be modified into a continuous or quasi-continuous method for coating supporting layers in the form of endless strips.

Virtually any mechanically stable and porous materials may be used as the porous supporting layer. The choice of the supporting layer depends primarily on whether and how it is to be crosslinked with the separation layer and what requirements its chemical, mechanical and thermal stability has to satisfy.

The membranes according to the invention have all the features which determine the high power of separation and the favourable kinetic properties of the lipid films of biological membranes. In addition, they have a high resistance to fouling.

For these reasons, they are eminently suitable for use in technical separation processes, including desalination, effluent treatment, certain aspects of petroleum refining and the separation of optical antipodes.

The desalination of seawater by reverse osmosis (hyperfiltration) is superior to the distillation processes commonly used from the energy point of view. Membrane processes are isothermal and, instead of high evaporation enthalpies, require comparatively small amounts of osmotic work in the form of pump energy. In the past, this advantage of membrane processes over distillation processes has been offset by the disadvantages of inadequate throughput and short useful lives which has prevented or at least delayed the wide-scale use of membrane processes for the desalination of seawater. Compared with the membrane hitherto used in the desalination of seawater, the membranes according to the invention have a considerably higher throughput and also improved useful lives, thus disposing of the major arguments against the wide-scale use of membrane processes for obtaining fresh water from the sea.

Effluent treatment is that field of application of the hyperfiltration membranes according to the invention in which the high electrical surface charge density of the subsequently hydrophilised separation layer is most valuable because it is in this field that the fouling of relatively weakly charged or even completely noncharged surfaces has the most serious effect on the useful lives of the membranes.

The separation of mixtures of organic liquids, particularly hydrocarbon separation ($C_8$-mixtures), by pervaporation has hardly ever progressed beyond the experimental stage. Pervaporation (evaporation through membranes) is also a hyperfiltration process, but is dependent upon phase transitions in exactly the same way as distillation processes. Because of this, pervaporation uses approximately the same amount of energy as distillation processes. The throughput of a pervaporation process is lower than that of a distillation process. Theoretically, however, pervaporation processes can have an extremely high selectivity and it is primarily the lack of selectivity which has hitherto prevented the use of pervaporation processes in practice. The membranes according to the invention have a high degree of selectivity which is essential for the technical application of pervaporation processes. HFM's for pervaporation processes do not necessarily have to have monomolecular separation layers of bifunctional surfactants because, in this case, fouling is not an important factor so that the separation layer does not require a negative surface charge. Accordingly, pervaporation membranes may also be produced from monofunctional surfactants and because of this represent the most simple form of HFM of the type in question here.

The separation of optical antipodes by hyperfiltration by chiral separation layers is a process which, by virtue of the substantially two-dimensionally crystalline character of the closely packed separation layers, is distinguished by particularly high selectivity and, in addition, provides for a considerably greater throughput than corresponding processes of similar selectivity, particularly the crystallisation process. In addition, hyperfiltration is in no way a hard or aggressive process. Since only comparatively small quantities of surfactants are required for producing separation layers from surfactants, the production of separation layers from optically active surfactants and/or the subsequent chiralisation of initially optically inactive surfactants in the $\omega$-position is/are not particularly expensive either.

The separation layer of the membranes according to the invention is generally from 20 to 60 Å, preferably from 20 to 50 Å and most preferably from 20 to 40 Å thick. If necessary, the separation layers may even be considerably thicker. However, it is a particular advantage of the membranes according to the invention that separation layers only 50 Å thick are sufficiently strong and show good power of separation.

The supporting layer is between 0.05 mm and 1.0 mm thick and preferably 0.1 mm thick. If necessary, however, the supporting layer may even be thicker or thinner.

BRIEF DESCRIPTION OF THE DRAWINGS

The membranes according to the invention and the expressions "separation layer with felt structure", "separation layer with velvet structure", "bimolecular film", "monomolecular film", "supporting layer", "gel layer", "monofunctional lipoids", "bi- and poly-functional lipoids", etc. are described and explained in the following with reference to the accompanying drawings (FIGS. 1 to 11), wherein:

FIGS. 5 to 8 are cross-sections through monomolecular films;

FIGS. 9 to 11 are cross-sections through separation layers according to the invention fixed to a supporting layer.

Figure 1:
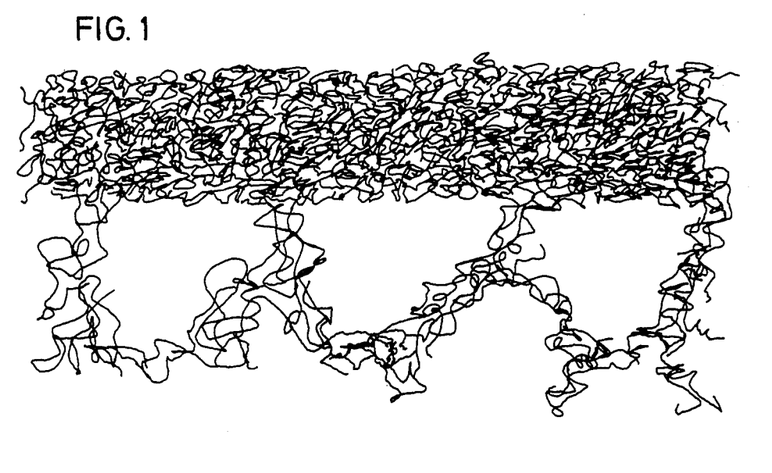
FIG. 1 is a cross-section through a conventional membrane (a separation layer 1 with felt structure is applied to a coarse-pored supporting layer 2).
Figure 2:
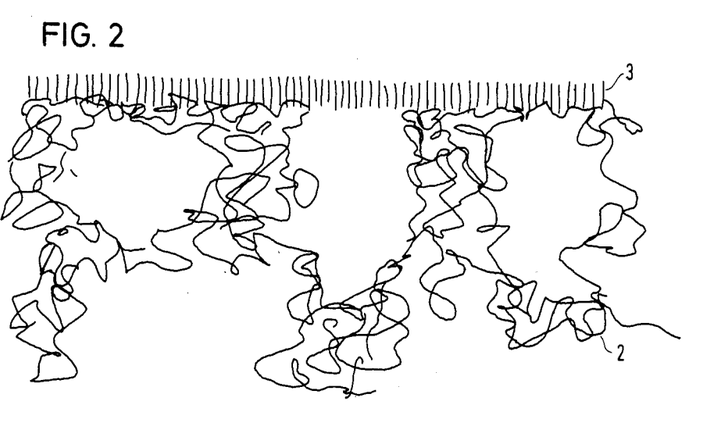
FIG. 2 is a cross-section through a membrane according to the invention (a separation layer with a velvet structure 3 is applied to a coarse-pored supporting layer 2).
Figure 3:
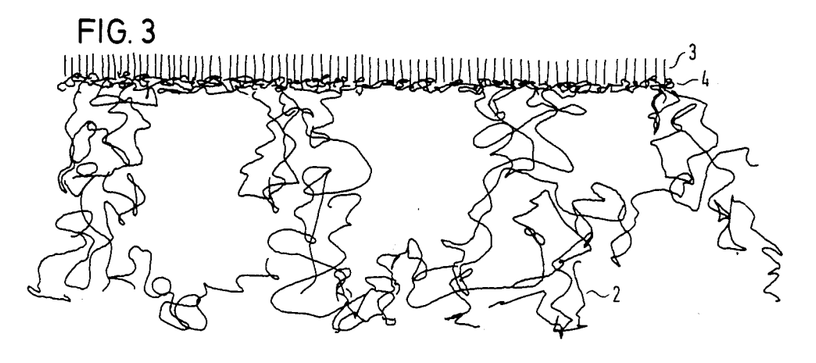
FIG. 3 is a cross-section through another membrane according to the invention (a separation layer with a velvet structure 3 is applied to a fine-pored gel layer 4 which is in turn applied to the coarse-pored supporting layer 2).
Figure 4:
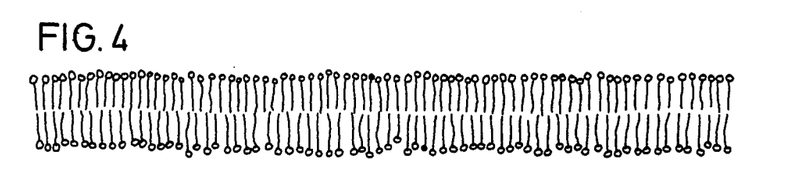
FIG. 4 is a cross-section through a bimolecular film of monofunctional lipoids or surfactants (the functional groups—circles—are hydrophilic groups).
Figure 5:
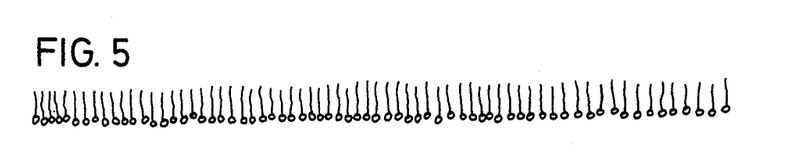
FIG. 5 shows a monomolecular film of monofunctional lipoids or surfactants (the functional groups—circles—are hydrophilic groups)
Figure 6:
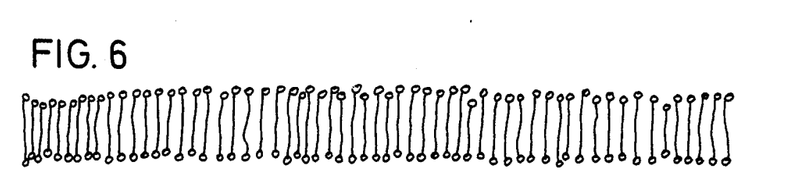
FIG. 6 shows a monomolecular film of bifunctional lipoids or surfactants (the functional groups—circles—are hydrophilic groups)
Figure 7:
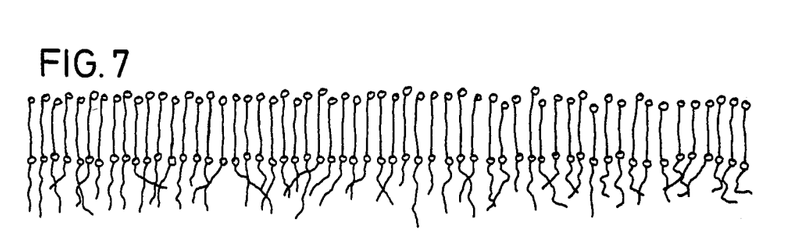
FIG. 7 shows a monomolecular film of trifunctional lipoids or surfactants (the two identical functional groups—circles—are hydrophilic groups whilst the third functional group—tail—is another hydrophilic residue)
Figure 8:
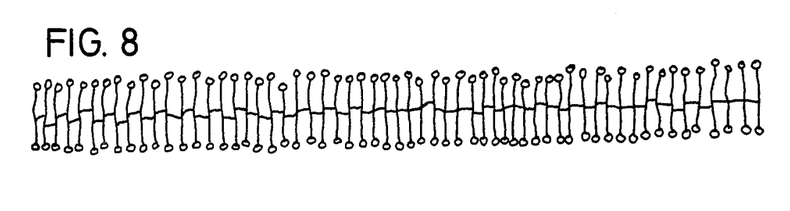
FIG. 8 shows a crosslinked monomolecular film of trifunctional lipoids or surfactants (the two identical functional groups—circles—are hydrophilic groups, the third functional group being used for crosslinking in the hydrophobic part of the film).
Figure 9:
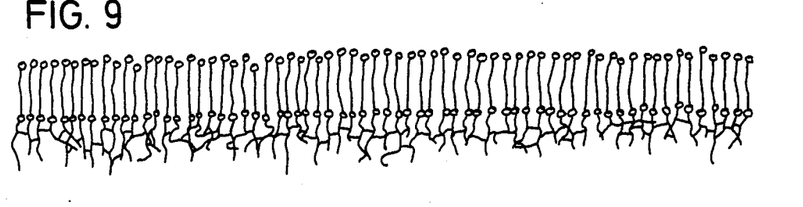
FIG. 9 shows a crosslinked monomolecular film of trifunctional lipoids or surfactants. The two functional groups (circles) are hydrophilic groups, the third functional group—in this case another hydrophilic residue—is used for crosslinking in the hydrophilic part of the film.
Figure 10:
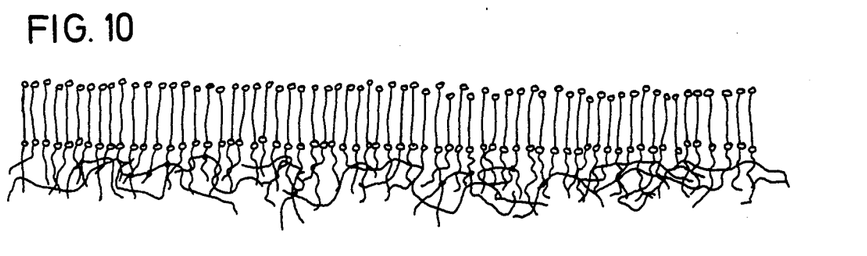
FIG. 10 shows a crosslinked monomolecular film of trifunctional lipoids or surfactants. The two identical functional groups (circles) are hydrophilic groups, the third group is another hydrophilic residue. Crosslinking takes place through macromolecules of the subphase (gel or supporting layer).
Figure 11:
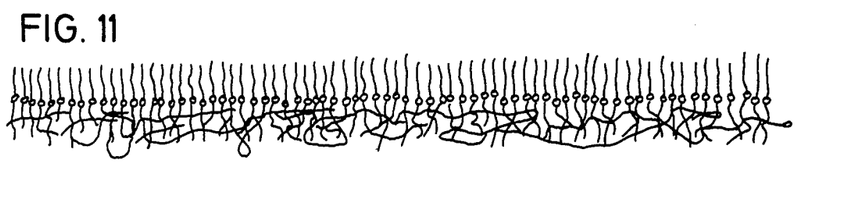
FIG. 11 shows a crosslinked, monomolecular film of bifunctional lipoids or surfactants. The molecules have a fixed charge (circles) and another hydrophilic group through which they are crosslinked with the macromolecules of the subphase (gel or supporting layer). The hydrophobic chains of the lipoids or surfactants are exposed on the surface of the separation layer.

Of the following observations, those which are made in connection with the surfactants apply equally to the surfactants which are used for producing the separation layers and to the surfactants contained in the separation layers. The expression "surfactants" as used in the following is also intended to cover surfactant-like lipoids. "Surfactants" are generally understood to be interfacially active compounds whereas lipoids are fat-like substances. Accordingly, surfactant-like lipoids are interfacially active, fat-like substances. The introduction of a gel layer between the separation layer and the supporting layer is necessary when the pore diameters of the supporting layer are so large that they cannot be spanned by the crosslinked separation layer or when the crosslinked separation layer is not sufficiently mechanically stable on its own. The gel layer may consist of the same material of which the supporting layer also consists, only its pore diameters should be sufficiently small. In the following, the gel layer of the membrane is not expressly dealt with separately from the supporting layer, but is regarded as part of the supporting layer.

Although lipoids which contain a hydrophobic central portion and two different hydrophilic terminal groups and of which the more strongly hydrophilic terminal group has the opportunity to crosslink with the corresponding groups of at least two identical molecules are described in the literature, they are not used for technical purposes (Biochimica et Biophysica Acta, 360 (1974) 217-229, 487 (1977), 37-50).

The hydrophobic central portion may be a straight-chain or branched-chain aliphatic group, such as a straight-chain or branched-chain alkyl, alkenyl or alkinyl group. Some of the hydrogen atoms of the aliphatic group of the hydrophobic central portion or all the hydrogen atoms may be replaced by fluorine atoms or other halogen atoms.

In addition, the chains of the hydrophobic central portion may be interrupted by oxygen atoms. The hydrophobic central portion may contain one or more double or triple bonds. If it contains several double or triple bonds, they are preferably conjugated. In addition, the hydrophobic central portion may contain both double bonds and triple bonds at the same time.

The hydrophobic central portion may also contain a mixed aliphatic/aromatic chain. If the hydrophobic central portion contains a mixed aromatic/aliphatic chain, the same definitions as above apply to the aliphatic portion. The aromatic portion of the hydrophobic central part may be formed for example by a phenylene group or by a naphthylene group.

The hydrophobic central portion may also consist of two parallel aliphatic chains or if parallel aromatic chains or aromatic/aliphatic chains, as described above. These chains may be attached to one another.

Examples of hydrophobic central portions are given in the following. The hydrophobic central portion may be for example a straight (a), (f), (g) or branched (b), (e) aliphatic chain or a mixed aromatic/aliphatic chain (c). It may even be formed by two parallel chains (d), (e), (g) joined to one another at their ends.

$X-(CH_2)_n-Y$ (a)

(n = 12-44)

$X-[CH_2-CH(CH_3)-CH_2-CH_2]_n-Y$ (b)

(n = 4-12)

(c)

(n = 3-14)

(d)

(n = 4-10)

(e)

$X-(CH_2)_n-C{\equiv}C-C{\equiv}C-(CH_2)_n-Y$ (f)

(n = 6-22)

(g)

(n = 6-22; m = 12-44)

In examples (a) to (g), Y represents the strongly hydrophilic group and X the weakly hydrophilic group. Examples (a) to (e) are surfactants which are crosslinked with one another and with the molecules of the supporting layer through the strongly hydrophilic group Y. Examples (f) and (g) are surfactants which are crosslinked with one another through functional groups in the hydrophilic middle portions. In these cases, attachment to the supporting layer takes place through the strongly hydrophilic groups Y. In example (g), the surfactant molecule contains a second hydrocarbon chain as plasticiser. Example (e) is a hydrocarbon skeleton similar to that of a membrane lipoid of Thermoplasm acidophilum.

The number of carbon atoms in the hydrophobic central portion is commensurate with the number of carbon atoms in biological membrane lipoids. The hydrophobic tail of biological lipoids contains approximately 12 to 22 carbon atoms. Accordingly, the thickness of a bimolecular lipoid film corresponds to approximately 24 to 44 carbon atoms. Accordingly, the hydrophobic central portions of the surfactants proposed in accordance with the invention—where they are formed by hydrocarbon radicals—also contain up to 44 carbon atoms and preferably up to 36 carbon atoms. Where the hydrophobic central portion is formed by partly fluorinated hydrocarbons or by perfluorinated carbons, the maximum number of carbon atoms may be considerably lower. Examples (a) to (g) by no means represent a complete list.

In formulae (a) to (g), the hydrogen atoms of the aliphatic groups may be completely or partly replaced by fluorine atoms.

In formulae (a) and (d), n=12 to 44, preferably 18 to 40 and, more preferably, 24 to 36.

In formula (g), m has the same meaning as n in formulae (a) and (d).

In formula (b), n=4 to 12, preferably 6 to 10 and, more preferably, 7 to 9.

In formula (c), n=3 to 14, preferably 6 to 12 and, more preferably, 9 or 10.

In formula (e), n=4 to 10, preferably 7 to 9 and, more preferably, 8.

In formula (f), n=6 to 22, preferably 8 to 18 and, more preferably, 10 to 16.

The strongly hydrophilic group Y of the surfactants may be: a residue of a mono-, di- or higher oligosaccharide (for example residues of hexoses, heptuloses, octoloses and of saccharose, lactose, maltose or raffinose), a residue of a di-, tri- or oligo-peptide containing several reactive lateral groups (for example residues of polyserine, polylysine, polyhydroxy proline, polyornithine), a residue of a polyalcohol (for example residues of hexitols, heptitols, octitols and of polyvinyl alcohol), a residue of a polyamine (for example a residue of polyvinyl amine). It may also be formed by residues of several sugar molecules attached to one another through ether bridges. Another possibility are the short-chain condensation products of epichlorohydrin and glycidol. This list of possibilities is by no means complete. The important factor is that the strongly hydrophilic group should have at its disposal so many reactive groups that it may be simultaneously crosslinked with at least two more surfactant molecules adjacent the strongly hydrophilic groups and optionally with a polymer molecule of the subphase.

In the surfactants, the weakly hydrophilic group X may be for example —OH, —NH$_2$, —SH, —CHO,

—CH=CH—COOR, —CH=CH$_2$,

—CN, —CON$_3$, —COOR, —SR, —S$_2$R, —SCN or a halogen atom (chlorine, bromine, iodine), this list being by no means complete either. Under special conditions, —COOH— groups may also be suitable for use as weakly hydrophilic groups. The important factor is that the weakly hydrophilic group should be able to be converted into a negative fixed charge or another hydrophilic group or to be extended by a group having a negative fixed charge or another hydrophilic group. The group in question should preferably be the anion of a sulfonic acid.

The expression "no appreciable solubility in water" means that the surfactant molecules which are applied to the surface of an aqueous phase also remain on that surface and do not dissolve "appreciably", if at all, in the aqueous phase. The solubility in the aqueous phase should as far as possible amount to less than $10^{-6}$ and preferably to less than $10^{-8}$ mole/l. If the monomolecular surfactant layer is built up at the interface between an aqueous phase and an organic phase, the solubility in the organic phase should also be as low as possible.

The expression "spreading" is a special term in interfacial chemistry familiar to any expert in that subject. It means that molecules which are capable of moving on a surface also completely occupy that surface for their movement in the same way as the molecules of a gas take up all the volume available to them for their movement. Formally, molecules spread over a surface behave in the same as a two-dimensional gas.

The average interval between spread molecules may be deduced from their number per cm$^2$ of surface area. This interval may be determined in advance by the surface area made available to a certain number of molecules for spreading. Spreading need not necessarily take place at the interface between a liquid phase and a gaseous phase, it may also take place at the interface between two immiscible liquids, for example water and petrol. From spreading experiments, the minimum surface area required by a straight-chain relatively long fatty acid or hydrocarbon chain situated perpendicularly of the water surface works out at approximately 25 Å$^2$. Accordingly, approximately $4 \cdot 10^{18}$ molecules are required for covering 1 square meter of surface with a thick carpet of such molecules. The surface area required by surfactant molecules is also around 25 Å$^2$ per hydrocarbon chain of their hydrophobic part. If the hydrocarbon chains are branched or halogenated or if they contain for example aromatic rings, the surface area they require is correspondingly greater. If the strongly hydrophilic terminal group of the surfactant is more voluminous than the hydrophobic part of the molecule, the hydrophilic group determines the surface area occupied by the molecule. If the solubility of the molecules in the aqueous phase (and also in the organic phase, if any) and the adsorption density on the vessel walls are known, the number of surfactant molecules at the surface or interface of the aqueous phase may be exactly determined in advance and also experimentally adjusted. This is easiest when the solubility in the two phases and the adsorption density on the vessel walls are substantially zero. The surfactant is then dissolved in a readily volatile or water-soluble solvent or solvent mixture, such as for example ethyl alcohol or chloroform/methanol, and the resulting solution is carefully pipetted onto the surface or into the interface. The solvent then disappears in the adjoining phases and the surfactant molecules remain behind on the surface or at the interface.

Suitable starting materials for the process according to the invention are also lipoids and—obtained therefrom—hydrophobic parent substances of surfactants which have been obtained from membranes of microorganisms, particularly from the membranes of Thermoplasma acidophilum and Sulfolobus acidocaldarius. By virtue of the extreme environmental conditions (optimal growth of the organism at pH 2.0/59° C.), the cell membrane of the micro-organism Thermoplasma acidophilum shows extraordinary mechanical stability and high physical and chemical resistance. It is this which distinguishes it from all hitherto investigated biological membranes.

The most important structural element of these membranes is a bifunctional lipoid which is also responsible for their acid and temperature resistance. This lipoid spans the entire membrane and shows the structural features appearing in the following formula scheme:

$$CH_2-O-(CH_2-CH_2-CH(CH_3)-CH_2)_4-(CH_2-CH(CH_3)-CH_2-CH_2)_4-O-CH$$
$$CH-O-(CH_2-CH_2-CH(CH_2)-CH_2)_4-(CH_2-CH(CH_3)-CH_2-CH_2)_4-O-CH_2$$
$$CH_2OH$$

(with CH$_2$OH at top right above CH, and CH$_2$OH at bottom left below CH)

This lipoid, referred to hereinafter as DGTE, may be used as starting material in the process according to the invention. As the basic unit of the membranes according to the invention, it has particular advantages. The ether-like linkage between hydrophobic elements and polar head groups gives it a high resistance to acids. The chain branchings functionally replace the double bonds present in other lipoids of biological origin, thereby avoiding the danger of oxidative chain cleavage. Finally, the hydrophobic regions in the middle of the molecule are linked to one another by covalent bonds.

DGTE is the unit of a number of variants which form the membrane skeleton in different quantitative ratios. Whereas that end of the molecule facing the interior of the cell only ever has the free primary alcoholic group at its disposal, the outwardly oriented group carries substituents of different size and polarity.

A phospholipoid containing a phosphoryl monoglycosyl residue is quantitatively predominant. In addition, some other anionic phosphilipoids are present in smaller quantities.

Lipopolysaccharide in which the substituent consists of a linear polysaccharide containing a glucose fraction and 24 mannose residues is also of particular interest to the process according to the invention. In this case, the glucose forms a bridge between DGTE and the polymannose. The mannose residue may be split off enzymatically apart from the -Glu-Man-Man residue. This triglycosyl diglycerol tetra-ether is relatively easy to isolate. Since the substance spreads very well on water and may be crosslinked in the subphase, it is of particular interest to the process according to the invention.

The DGTE-containing lipoids contain more than 40% of the total lipid fraction of the cells. They may be isolated and cleaned very easily so that, after mass cultivation and optimisation of the process, adequate quantities of the individual lipoid fractions are available.

In connection with the recovery of these lipoids from biological membranes and their properties, reference is made to the Article by Thomas A. Langworthy in Biochem. Biophys. Acta (Amsterdam) 487 (1977), pages 37 to 50 and to the literature quoted therein.

EXAMPLE 1

Production of a monomolecular hyperfiltration separation layer by the polymerisation of spread surfactants containing diacetylene groups

The substance CH$_3$—(CH$_2$)$_{12}$—C≡C—C≡C—(CH$_2$)$_8$—COOH (hexacosa-10,12-diinic-1-acid) is applied in a chloroform solution (1 mg of substance/ml of solution) to the surface of water accommodated in a Langmuir tank. After evaporation of the solvent (5 minutes), the monomolecular film left behind is compressed at 20° C. to a pressure of 15 dyn/cm. The film is polymerised by exposure to ultraviolet light (254 nm) for 6 minutes. By lowering the water level, the film is applied to a slightly inclined asymmetrical ultrafiltration membrane of regenerated cellulose (Sartorius, special manufacture) as the porous support.

EXAMPLE 2

Production of a monomolecular hyperfiltration separation layer by the copolymerisation of spread surfactants containing acrylic acid and methacrylic acid ester groups The substance the substance are dissolved in 1 ml of chloroform in a ratio of 0.95 mg of I to 0.05 mg of II. As in Example 1, the solution is spread at 20° C. over water in a Langmuir tank and, after evaporation of the chloroform, is compressed to a pressure of 20 dyn/cm. The film is polymerised as in Example 1 by exposure to ultraviolet light (254 nm). By lowering the water level, the film is applied to an asymmetrical ultrafiltration membrane of cellulose triacetate (Sartorius, SM 145 39).

EXAMPLE 3

Fixing of a monomolecular hyperfiltration separation layer to a porous support

The procedure is as in Example 1, except that the chloroform solution additionally contains a small quantity of CH$_3$—(CH$_2$)$_{12}$—C≡C—C≡C—(CH$_2$)$_8$—O—PO(OH)$_2$ (monophosphoric acid ester of pentacosa-9,10-diin-1-ol), i.e. 5% by weight of the quantity of carboxylic acids weighed in. The film is polymerised and lowered onto an asymmetrical ultrafiltration membrane of regenerated cellulose (Sartorius, special manufacture) in the same way as in Example 1. The membrane is then removed from the Langmuir tank and tempered for 1 hour at 30° C. in a dry chamber. This fixes the separation layer to the supporting layer.

EXAMPLE 4

Fixing of a monomolecular hyperfiltration separation layer to a porous support

The procedure is as in Example 2, except that substances I and II are dissolved in a ratio of 0.80 mg to 0.20 mg per ml of chloroform. The supporting membrane used is an asymmetrical ultrafiltration membrane of cellulose diacetate which has been treated with boiling ethylene sulfide (56° C.) in the vapour phase (1 mole of ethylene sulfide per mole of free hydroxyl group). After polymerisation of the monomolecular film and after application to the supporting layer, the film is fixed to the supporting membrane in a moist chamber at room temperature in the presence of gaseous trimethyl amine. This process takes no longer than 15 minutes.

EXAMPLE 5

Production of a monomolecular hyperfiltration separation layer having a hydrophilic surface and fixing of the separation layer to a porous supporting layer The substances and $$CH_3-(CH_2)_{12}-C\equiv C-C\equiv C-(CH_2)_8-COOH \qquad (II)$$

are dissolved in chloroform in a molar ratio of 1:1 (a total of 1 mg of surfactant per ml of CHCl$_3$). The aqueous subphase in the Langmuir tank should be adjusted to pH 8. After co-spreading over the Langmuir tank and evaporation of the solvent, the film is again compressed to 15 dyn/cm. The still unpolymerised film is then transferred to the supporting membrane by lowering an asymmetrical ultrafiltration membrane of cellulose diacetate into the subphase of the Langmuir tank from above under a constant spreading pressure (immersion or stamping process). The film is polymerised and at the same time fixed to the supporting membrane by irradiation with ultraviolet light.

EXAMPLE 6

Production of a monomolecular hyperfiltration separation layer by crosslinking spread surfactants containing —OH—groups A solution of n-octadecyl gluconamide in a mixture of 2 parts of chloroform and 1 part of methanol is prepared at 50° C. The solution has a concentration of 0.4 mg/ml. The solution is spread over the Langmuir tank and, after evaporation of the solvent, is compressed to 16 dyn/cm. The film is firm and is applied by lowering the water level to an asymmetrical ultrafiltration membrane of cellulose diacetate. The membrane is then fixed for 12 hours in a moist chamber at 20° C. using gaseous epichlorohydrin. In this way, the monomolecular film is both crosslinked and fixed to the supporting membrane.

EXAMPLE 7

Production of a monomolecular hyperfiltration separation layer by crosslinking co-spread surfactants containing —NH$_2$— and —OH—groups The procedure is as in Example 6, except that a solution of 0.24 mg of octadecylamine and 0.40 mg of n-octadecyl gluconamide per ml of CHCl$_3$:CH$_3$OH (2:1) is used. The film produced from this solution is liquid at 30 dyn/cm. After application to an asymmetrical ultrafiltration membrane of cellulose diacetate, the membrane is first prefixed for 70 h at 20° C. with gaseous epichlorohydrin and then finally fixed by immersion for 10 minutes at room temperature in a 1% solution of hexamethylene diisocyanate in trichloroethylene.

EXAMPLE 8

Production of a monomolecular hyperfiltration separation layer having negative surface charges by crosslinking spread surfactants containing —OH—groups The procedure is initially the same as in Example 6, except that a solution of ω-bromo-octadecyl gluconamide in a mixture of chloroform/methanol (2:1) is used. After application to the ultrafiltration membrane, the film is prefixed with gaseous epichlorohydrin and finally fixed with hexamethylene diisocyanate in the same way as in Example 7. The entire membrane is then washed with water, treated for 30 minutes at 40° C. with a 5% aqueous NaSH-solution, washed again, immersed for 10 minutes at 40° C. in a 5% solution of propane sultone in toluene anf finally washed once again with water.

EXAMPLE 9

Production of a monomolecular hyperfiltration separation layer having a polar and a chiral surface The procedure is as in Example 8, except that the membrane is treated with d- and l-1-methyl propane sultone.

EXAMPLE 10

Production of a monomolecular hyperfiltration membrane by crosslinking a spread surfactant layer with a gel layer of polyvinyl alcohol A glass plate is coated in known manner with a monomolecular layer of Cd$^{2+}$-arachinate and thus rendered hydrophobic. The plate thus prepared is completely immersed from above through a monomolecular film of octadecyl gluconamide and octadecyl amine (see Example 7) spread at 30 dyn/cm in the aqueous subphase at a rate of 2.4 cm/sec. After removal of the monomolecular film left behind from the surface, the plate is withdrawn again. It is now coated with another monomolecular film. The plate is briefly dried and then immersed in a 20% aqueous solution of polyvinyl alcohol. After another 5 minutes, the plate is removed from the PVA-solution and suspended from its upper end for another 5 minutes to allow the adhering liquid to drain off. The PVA-solution still adhering thereafter is removed from the lower edge of the plate with a filter paper, after which the plate is dried over silica gel in an exsiccator. The plate is then introduced into a chamber filled with gaseous hexamethylene diisocyanate and left there for 15 minutes. The crosslinked PVA-surfactant layer is then removed from the glass plate and washed with water.

EXAMPLE 11

Production of a hollow fibre having a bimolecular separation layer for the separation of gases A hollow fibre of porous polypropylene is immersed in an aqueous subphase at a rate of 2.4 cm/sec. through a monomolecular film of hexacosa-10,12-diinic-1-acid spread over that subphase (containing 1 g/l of CdCl$_2$) at 20° C. under a pressure of 20 dyn/cm. After complete immersion, the hollow fibre is pulled up again under the same pressure, left for 5 minutes with its lowermost tip in the subphase to allow adhering subphase liquid to drain off and then completely removed. Thereafter the liquid still adhering to the tip of the hollow fibre is removed with a filter paper. The bimolecular film on the surface of the hollow fibre is then crosslinked for 1 minute by slowly rotating the fibre in front of a UV aperture radiator (4000 mW/cm$^2$).

These Examples are representative but by no means comprehensive.

We claim:

1. A hyperfiltration planar membrane for use in a separation process which comprises: a diffusion separation layer supported by a porous, mechanically stable supporting layer, said separation layer consisting essentially of at least one cross-linked monomolecular film formed from a surfactant each molecule of which contains at least one hydrophobic chain and at least one hydrophilic group, said molecules of said surfactant being cross-linked with one another through polymerizable groups in at least one of their hydrophobic chains and or at least one of their hydrophilic groups, and said crosslinked monomolecular film having a crystalline structure in which the hydrophobic chains of the cross-linked molecules thereof are oriented essentially perpendicular to the plane of said membrane and parallel to the direction of diffusion therethrough, whereby a high retention level can be obtained while maintaining a high rate of flux when said membrane is used in a separation process.

2. A membrane according to claim 1 in which said separation layer has a thickness of about 20–60 Å.

3. A membrane according to claim 2 in which said separation layer comprises two or more superimposed monomolecular films.

4. A membrane according to claim 2 in which said porous supporting layer is a cellulosic layer of a thickness of about 0.05–1.0 mm.

5. A membrane according to claim 1 in which each surfactant molecule comprises a hydrophobic central chain comprising a straight or branched chain aliphatic group, or a mixed aliphatic/aromatic group, or parallel aliphatic or mixed aliphatic aromatic groups.

6. A membrane according to claim 5 in which the chains are halogenated or oxygenated.

7. A membrane according to claim 1 in which said polymerizable groups of said surfactant are also cross-linked with polymerizable groups of said separation layer.

8. A membrane according to claim 1 in which said separation layer is joined to said supporting layer by means of an intermediate layer having a pore diameter smaller than that of said supporting layer.

9. A membrane according to claim 8 in which said intermediate and supporting layers are of the same material.

* * * * *